United States Patent
Dyka et al.

(10) Patent No.: US 10,474,431 B2
(45) Date of Patent: Nov. 12, 2019

(54) DEVICE AND METHOD FOR MULTIPLICATION FOR IMPEDING SIDE-CHANNEL ATTACKS

(71) Applicant: IHP GMBH—INNOVATIONS FOR HIGH PERFORMANCE MICROELECTRONICS/LEIBNIZ-INSTITUT FÜR INNOVATIVE MIKROELEKTRONIK, Frankfurt (Oder) (DE)

(72) Inventors: Zoya Dyka, Frankfurt (DE); Peter Langendorfer, Frankfurt (DE)

(73) Assignee: IHP GMBH—INNOVATIONS FOR HIGH PERFORMANCE MICROELECTRONICS/LEIBNIZ-INSTITUT FUR INNOVATIVE MIKROELEKTRONIK (DE)

( * ) Notice: Subject to any disclaimer, the term of this patent is extended or adjusted under 35 U.S.C. 154(b) by 236 days.

(21) Appl. No.: 15/523,977

(22) PCT Filed: Nov. 6, 2015

(86) PCT No.: PCT/EP2015/075993
§ 371 (c)(1),
(2) Date: Aug. 23, 2017

(87) PCT Pub. No.: WO2016/071523
PCT Pub. Date: May 12, 2016

(65) Prior Publication Data
US 2017/0357484 A1    Dec. 14, 2017

(30) Foreign Application Priority Data

Nov. 7, 2014  (DE) .......................... 10 2014 222 825

(51) Int. Cl.
*G06F 21/00* (2013.01)
*G06F 7/53* (2006.01)
*H04L 9/00* (2006.01)

(52) U.S. Cl.
CPC ............ *G06F 7/5324* (2013.01); *H04L 9/003* (2013.01); *G06F 2207/7252* (2013.01); *G06F 2207/7257* (2013.01); *H04L 2209/08* (2013.01)

(58) Field of Classification Search
CPC ........... G06F 7/5324; G06F 2207/7252; G06F 2207/7257; H04L 9/003; H04L 2209/08
See application file for complete search history.

(56) References Cited

U.S. PATENT DOCUMENTS 5,073,870 A * 12/1991 Morita .................. G06F 7/4824
708/491
5,144,574 A * 9/1992 Morita .................. G06F 7/4824
708/491

(Continued)

FOREIGN PATENT DOCUMENTS

DE    10 2007 007 699 A1    8/2008

OTHER PUBLICATIONS

Luca Benini, et al, "Energy-Aware Design Techniques for Differential Power Analysis Protection"; Design Automation Conference, 2003; Proceedings; IEEE, 2003; pp. 36-41.

(Continued)

*Primary Examiner* — Ghodrat Jamshidi
(74) *Attorney, Agent, or Firm* — Ware, Fressola, Maguire & Barber LLP

(57) ABSTRACT

A device for multiplying two bit sequences has a controller that selects and activates exactly one multiplier unit from a plurality of parallel multiplier units, according to a random signal. A partial multiplier unit shared by all the multiplier units receives and multiplies operands formed by the respec- (Continued)

tively activated multiplier unit. Each multiplier unit implements a different multiplication method with a respective selector unit that selects segments of the bit sequences to be multiplied, in accordance with a selection plan adapted to the respective multiplication method, to form operands from one or more segments and outputs the operands. The respective accumulation unit receives step by step partial products from the partial multiplier unit, accumulates the partial products in accordance with an accumulation plan adapted to the implemented multiplication method and matching the selection plan, and outputs the calculated product of after accumulation has been completed.

12 Claims, 5 Drawing Sheets

(56) References Cited

U.S. PATENT DOCUMENTS

| | | | | |
|---|---|---|---|---|
| 6,004,022 | A * | 12/1999 | Tsubakihara | G06F 7/5324 |
| | | | | 708/628 |
| 8,457,919 | B2 | 6/2013 | Benoit et al. | |
| 2004/0109561 | A1 * | 6/2004 | Koc | G06F 7/725 |
| | | | | 380/28 |
| 2005/0182813 | A1 * | 8/2005 | Cho | G06F 7/5324 |
| | | | | 708/620 |
| 2005/0228845 | A1 * | 10/2005 | Pius Ng | G06F 7/5306 |
| | | | | 708/627 |
| 2006/0291571 | A1 * | 12/2006 | Divsalar | H03M 13/116 |
| | | | | 375/242 |
| 2008/0219450 | A1 * | 9/2008 | Ebeid | G06F 7/725 |
| | | | | 380/277 |
| 2010/0150343 | A1 * | 6/2010 | Rombouts | H04L 9/002 |
| | | | | 380/44 |
| 2011/0007894 | A1 * | 1/2011 | Takenaka | G06F 7/723 |
| | | | | 380/28 |
| 2013/0073930 | A1 * | 3/2013 | Yazaki | H03M 13/09 |
| | | | | 714/803 |
| 2013/0262544 | A1 * | 10/2013 | Lee | G06F 7/533 |
| | | | | 708/250 |
| 2013/0287209 | A1 * | 10/2013 | Itoh | H04L 9/003 |
| | | | | 380/44 |
| 2014/0281573 | A1 * | 9/2014 | Jaffe | G06F 21/72 |
| | | | | 713/189 |
| 2015/0288520 | A1 * | 10/2015 | Jacobson | H04L 9/3066 |
| | | | | 380/28 |
| 2016/0072622 | A1 * | 3/2016 | Al-Somani | H04L 9/003 |
| | | | | 380/28 |

OTHER PUBLICATIONS

Zoya Dyka, et al, "Proposing Individualization of the Design of Cryptographic Hardware Accelerators as Countermeasure Against Structure and Side Channel Analysis"; International Association for Cryptologic Research; Bd.20150319:144001; Mar. 19, 2015; pp. 1-4.

* cited by examiner

- Prior art -

DEVICE AND METHOD FOR MULTIPLICATION FOR IMPEDING SIDE-CHANNEL ATTACKS

CROSS REFERENCE TO RELATED APPLICATIONS

This application is the U.S. National Stage of International Application Number PCT/EP2015/075993 filed on Nov. 6, 2015, which application claims priority under 35 USC § 119 to German Patent Application No. 10 2014 222 825.5 filed on Nov. 7, 2014. Both applications are hereby incorporated by reference in their entirety.

TECHNICAL FIELD

The present invention relates to devices and methods for multiplying two factors.

BACKGROUND OF THE INVENTION

One field of application for the present invention is to hide side channel leakage of cryptographic chips. Wireless networks, such as sensor networks, for example, are a relatively new technology which has nevertheless succeeded in acquiring commercial relevance. In the field of automation engineering, the use of wireless systems and also wireless sensor networks will gain in importance in the years ahead and will generate competitive advantage if providers can offer secure wireless systems.

One important security aspect lies in the protection of critical info structures. Wireless systems are used intensively in this area also.

The use of wireless systems gives rise to the following changes regarding the safeguarding of IT security:

1. Every wireless device can be physically attacked, not only via the network connection, but also directly after purchase. Standard security solutions originating from the field of fixed network communication, where all attacks are channeled through the Internet connection, are no longer adequate.

2. Wireless devices cannot always be contacted. If the wireless link is poor, or if the devices are in power-saving mode, breaks in contact may occur, lasting from a few seconds to minutes or even hours. Since the visibility of the wireless device changes, an attacker can steal one, unnoticed by the lawful owner, and examine it in his laboratory in order to extract a secret cryptographic key, for example, which not only destroys the confidentiality of communication, but also allows identity theft. The attacker can then return the device or bring a cloned device into the network, without the lawful owner necessarily being able to notice what is happening.

Such an attack is all the more likely to succeed, the faster it can be carried out. This is, because the sooner the attacked device is re-integrated in the network, the lower the likelihood of its temporary absence being discovered. In order to reduce the amount of time needed to carry out an attack on the hardware, such an attack is normally prepared meticulously. The cryptographic hardware is normally attacked in two steps. In the first step, a number of devices are analyzed in order to gain acquaintance with their design and behavior. The aim of this first step is to prepare and facilitate the attack on an actual target device in the second step. Performing such an attack in two steps is conditional on the attacker being able to procure a sufficiently large number of identical devices. That is usually not a problem, because ASICs are produced in large numbers and are so inexpensive that an attacker can easily buy as many ASICs as are needed. After such preparation, the actual target devices can be stolen and attacked.

One known method of attack is differential power analysis (DPA), which involves analyzing how the measurable power traces (PT) of processors depends over time on the processed data while those data are being processed.

The aim of all protective measures against DPA can be briefly formulated as follows: modify the appearance of a crypto-operation's PT is such a way that the attacker is unable to identify which data are being processed when and how.

The following technologies are known for protecting against DPA in the case of a cryptographic application which uses elliptic curve cryptography (ECC):

1. randomizing the key
2. point blinding elliptic curves
3. randomizing the projective coordinates of EC points The main objective of these DPA countermeasures is to avoid any dependence of measurable power traces (PT) on input data known to the attacker. The input data known to the attacker are combined with random data. As a result, the power traces no longer show the processing of the input data known to the attacker, or any other previously defined (fixed) input data, but the processing of data which are unknown to the attacker.

Other mathematical protective mechanisms randomize how the cryptographic algorithm is executed: the algorithm is no longer executed sequentially in a predefined sequence of mathematical operations, but the mathematical operations are replaced by a "randomly determined order" in such a way that the correct result is nevertheless delivered at the end of the calculation. The attacker is deprived in this way of the knowledge of when exactly, and exactly which operations are executed with exactly which input data.

Protective measures based on randomization have been successfully attacked in the meantime. The ineffectiveness of protective measures is described more and more often in the literature. The development of DPA-resistant implementations is becoming more complicated. Since there are now attacks against protective measures, it is necessary to design and correctly implement protective measures for the protective measures themselves. For example, a DPA protective measure—randomizing the key—can be successfully attacked with a carry-based attack. This means that not only the original cryptographic implementation against DPA must be protected, but that a mechanism must also be developed and implemented which can protect the randomization of the key against a carry-based attack.

Another way of making DPA more difficult is to significantly increase the level of noise while the cryptographic operations are being calculated. Information useful for DPA is concealed (hidden) in the noise. The following measures, among others, can be used to conceal information useful for DPA: introducing dummy operations, introducing random delays and introducing random dummy operations. Since typical ECC circuits are large (with thousands of gates), a signal level of a signal useful for an attacker is high. Increasing the noise level during execution of the EC cryptographic operation (thousands of clocks), in order to conceal the useful information in the noise therefore involves a high power consumption.

The complexity, the implementation time and the costs involved in implementing cryptographic algorithms are thus growing strongly. The power consumption and the chip area required to implement cryptographic application with integrated DPA countermeasures are increasing accordingly.

SUMMARY OF THE INVENTION

Embodiments of the present invention shall now be described.

A first aspect of the present invention is a device for multiplying two bit sequences, comprising:

a controller which is adapted to select and activate exactly one multiplier unit for performing multiplication from a plurality of implemented multiplier units, according to a random signal on the input side, a partial multiplier unit which is shared by all multiplier units and is adapted to receive operands formed by the respectively activated multiplier unit and to multiply the received operands with each other, wherein each multiplier unit implements a different multiplication method to perform a multiplication and for that purpose has a respective selector unit and a respective accumulation unit which are designed for the multiplication method being implemented, wherein the respective selector unit is designed to select segments of the bit sequences to be multiplied, step by step in accordance with a selection plan adapted to the respective multiplication method, to form operands from one or more segments and to output said operands to the partial multiplier unit, and wherein the respective accumulation unit is designed to receive step by step the partial products outputted by the partial multiplier unit, to accumulate said partial products in accordance with an accumulation plan adapted to the implemented multiplication method and matching the selection plan, and to output the calculated product of the bit sequences after accumulation has been completed.

The device according to the present invention is based on the discoveries described in the following.

The multiplication of two large factors—e.g., long bit sequences which in the case of ECC are the elements from $GF(p)$ or from $GF(2^n)$—is a time-consuming and power-consuming mathematical operation which is often executed. Implementing multiplication as just one calculation step in hardware is possible, but requires a large chip area, which in turn makes production costs relatively high. In order to keep the required area and the production costs low, the multiplication of bit sequences in hardware implementation is typically performed in several steps, i.e. serially. Factors $A(x)$ and $B(x)$, n bits in size, are split into smaller parts—the partial factors or segments—in a manner which is known per se. In a respective, step (e.g. in one clock cycle), only one partial product is calculated. A 2n–1 bit product of the elements from $GF(2^n)$ is obtained from the calculated partial products (without reduction), or a 2n bit product in the case of elements from $GF(p)$.

Since it was and still is important to optimize the required chip area, the execution time and the power consumption of a multiplier, there are several multiplication methods nowadays that can also be executed serially. Examples include the classical or school multiplication method, the Karatsuba multiplication method, the Winograd multiplication method and other known multiplication methods.

The present invention makes use of this diversity; it exploits that fact that, as a rule, different serial multiplication methods each use different segmentation of factors, each require a different number of steps and a different equation for calculating the product from the partial products. In other words, different serial multiplication methods each have a different plan for performing the multiplication and each have their own complexity, as expressed in a number of Boolean operations that are needed. It is true that there are some serial multiplication methods which use the same segmentation of factors. Despite that, the execution plan and the complexity of every such multiplication method is different, i.e. individual.

A conventional device for serial multiplication of two bit sequences basically comprises three units:

1st unit: a selector unit—for selecting the operands for partial multiplication.

This unit splits the factors into segments m bits in size, calculates and outputs to the downstream partial multiplier its m-bit operands step by step in accordance with the execution plan of the defined multiplication method being used.

2nd. unit a partial multiplier unit

This unit calculates partial products of the m-bit operands, typically one partial product in each respective step. The partial multiplier unit has a plurality of internal partial multipliers and is designed to form partial operands having a predetermined number of bits in a respective step from the operands which are supplied and to distribute said partial operands to a predetermined number of partial multipliers necessary for the multiplication of said operands and to calculate a respective partial product using the outputs from the predetermined number of partial multipliers. The structure of the partial multiplier unit is fixed and predefined and does not change in the course of the calculation.

3rd unit an accumulation unit—for accumulation of the partial products

This unit calculates the product from the partial products in accordance with the fixed, predetermined accumulation plan of the multiplication method being used.

The device according to the invention differs from such a conventional structure by having a plurality of multiplier units. Each of the multiplier units implements a different multiplication method to perform a multiplication (in particular a serial multiplication) and for that purpose has a respective selector unit and a respective accumulation unit which are designed for the multiplication method being implemented. A controller is adapted to randomly select, according to a random signal on the input side, exactly one of those multiplier units for performing the multiplication, and to activate the selected multiplier unit. This makes the power consumption dependent not only on input data, but also on the active structure which is respectively involved in the calculation.

However, the different multiplier units share a partial multiplier unit which is shared by all the multiplier units and which is adapted to receive operands formed by the respectively activated multiplier unit and to multiply the received operands with each other.

In contrast to conventional structures in which the accumulation plan is fixed and predetermined, the device according to the invention can vary the multiplication method, and thus the selection and accumulation plan, in accordance with a random signal. This fact makes the power consumption dependent not only on input data, but also on the active structure which is involved in the calculation.

Randomly selecting the multiplication method and thus the selection and accumulation plan of the multiplication method being used thus renders it impossible for attackers to execute multiplication operations either by predicting them or by subsequently identifying them using PA side channel attacks (involving efforts that seem worthwhile to the attacker), thus provides a significantly enhanced level of protection, especially in the context of cryptographic operations.

The structure of the inventive multiplication device is thus implemented in such a way that the protection of the cryptographic operation is intrinsically included in the implementation, in contrast to the known PA countermeasures that are installed additionally.

Some embodiments of the device according to the first aspect of the invention shall now be described.

In some embodiments, the device is designed to multiply two bit sequences in a single step, i.e. in one clock cycle. This can be done when the length of the bit sequences to be multiplied is less than the length of the operands which the partial multiplier unit multiplies with each other. In other embodiments, it is designed to multiply received operands in a plurality of steps or clock cycles. This can be decided in the circuit design, for example on the basis of the length of the operands to be received, taking other boundary conditions for the design and the operational requirements of the partial multiplier unit into consideration.

In one embodiment the device according to the invention, the multiplier unit, namely the selector unit or the accumulator unit in particular, or the selector unit and the accumulator unit viewed as a functionally interacting unit, is designed to perform in random order the selection steps and accumulation steps predefined in the respective selection plan and in the respective accumulation plan, and in particular to randomly permute the order of the predefined selection and accumulation steps of a respective execution plan for multiplication. For example, the respective selector unit is designed to randomly select in accordance with a second random signal from the segments predefined in the selection plan, to form the operands from said selected segments, and to signal to the accumulation unit which operands are to be outputted for partial multiplication, according to the selection made.

In another variant of this device, the accumulation unit is designed to determine whether currently selected segments have been selected repeatedly in the random selection, and in that case to reject a respective partial product which has been received repeatedly.

In another embodiment, the selector unit is designed to prevent repetitions during random selection. For this purpose, registers may be used in which segments that have already been selected are temporarily stored. Alternatively, the currently selected segments may be removed after every random selection step from the set of segments to be selected from according to the selection plan.

In one embodiment, the partial multiplier unit preferably has a total number of (internal) partial multipliers which is greater than the predetermined number of partial multipliers necessary for calculation, and is designed to form partial operands having a predetermined number of bits from the operands which are supplied in one step and to distribute said partial operands to a predetermined number of active partial multipliers from the plurality of partial multipliers and to calculate a respective partial product using the outputs from said partial multipliers, and the total number of partial multipliers includes at least two groups of partial multipliers which implement different multiplication methods in groups. The partial multiplier unit is designed to randomly select the predetermined number of activated partial multipliers from the total number of partial multipliers, subject to the condition that at least one of the partial multipliers belongs to a different group of partial multipliers than the other selected partial multipliers, and to distribute the partial operands only to the randomly selected partial multipliers. Thus, in contrast to conventional structures in which the structure of the partial multiplier unit is fixed and predefined and does not change in the course of calculating the product of two incoming bit sequences, the device in the present embodiment contains a partial multiplier unit in which the part activated to calculate the respective partial product changes dynamically, namely in the course of the calculation. This fact makes the power consumption additionally dependent on the respectively active structure of the respective partial multiplier involved in calculation, not only at the level of the multiplier unit, but also at the level of the partial multiplier unit that is used in common by all the multiplier units.

In another embodiment of the device, the partial multiplier unit has an input unit which is designed to form partial operands having a predetermined number of bits from the operands supplied to it and to allocate and supply the partial operands in a random manner to a predetermined number of partial multipliers, and to output control information which indicates how the partial operands have been allocated to the partial multipliers. In this embodiment, the partial multiplier unit does not have more partial multipliers than a predetermined number of partial multipliers necessary for the partial multiplication. The total number of partial multipliers is distributed among at least two groups each having at least one partial multiplier, and the partial multiplier(s) of each group implement a different multiplication method than the partial multipliers of the other groups. It is preferred that the partial multiplier unit also has an output unit which receives the control information and which is designed to receive calculated partial products from the respective partial multipliers, and to output said partial products, in accordance with said control information.

A second aspect of the invention is a device for multiplying two bit sequences, comprising:

a selector unit which is designed to select step-by-step segments of the bit sequences, to be multiplied, in accordance with a selection plan, to form operands from one or more segments and to output said operands to the partial multiplier unit, a partial multiplier unit, which is designed to receive the operands formed and to multiply them with each other, preferably in one, i.e., in one single step, an accumulation unit which is designed to receive partial products outputted by the partial multiplier unit, to accumulate said partial products in accordance with an accumulation plan matching the selection plan, and to output the calculated product of the bit sequences after accumulation has been completed, wherein the selector unit and the accumulation unit are designed to randomly permute a sequence of selection steps and accumulation steps predefined in the respective selection plan and in the respective accumulation plan.

Embodiments of this device may have the same additional features as the embodiments, already described, of the device according to the first aspect. Further embodiments of the device of the device according to the second aspect shall now be described.

In one embodiment, the partial multiplier unit has a plurality of partial multipliers and is designed to form partial operands having a predetermined number of bits from the operands which are supplied in one respective step and to distribute said partial operands to a predetermined number of active partial multipliers from the plurality of partial multipliers and to calculate a respective partial product using the outputs from said partial multipliers.

In a first of two alternative variants of this embodiment, the partial multiplier unit has a total number of partial multipliers which is greater than the predetermined number of partial multipliers necessary to calculate the partial product, and calculates a respective partial product using the outputs from the partial multipliers, and the total number of partial multipliers includes at least two groups of partial multipliers which implement different multiplication methods in groups. In this variant, the partial multiplier unit is preferably designed to randomly select the predetermined number of activated partial multipliers from the total number of partial multipliers, subject to the condition that at least one of the partial multipliers belongs to a different group of partial multipliers than the other selected partial multipliers, and to distribute the partial operands only to the randomly selected partial multipliers.

In a second of these two alternative variants of the cited embodiment, the partial multiplier unit has an input unit which is designed to form, in one step, partial operands having a predetermined number of bits from the operands supplied to it and to allocate and output the partial operands in a random manner to a predetermined number of partial multipliers, and to output control information which indicates how the partial operands have been allocated to the partial multipliers. In this variant, it is preferred that the partial multiplier unit does not have more partial multipliers than a predetermined number of partial multipliers necessary for the partial multiplication. A total number of partial multipliers in the partial multiplier unit is preferably distributed among at least two groups each having at least one partial multiplier, wherein the partial multipliers of each group implement a different multiplication method than the partial multipliers of the other groups. The partial multiplier unit preferably has an output unit which receives the control information and which is designed to receive outputs from the respective partial multipliers and to calculate and output the respective partial product using said outputs, in accordance with said control information.

A suitable partial accumulation plan, which differs according to the multiplication method being implemented for the partial multiplier specified in the control information, is typically used to calculate the partial product.

A third aspect of the invention is a device for multiplying two bit sequences, comprising:

a selector unit which is designed to select, step by step in accordance with a selection plan, segments of the bit sequences to be multiplied, to form the inputs for the partial multiplier units from said selected segments and to output said inputs to the partial multiplier unit, a partial multiplier unit, which is designed to receive the operands supplied and to multiply them with each other in one step, an accumulation unit which is designed to receive step by step partial products outputted by the partial multiplier unit, to accumulate said partial products in accordance with an accumulation plan matching the selection plan, and to output the calculated product of the bit sequences after accumulation has been completed, wherein the partial multiplier unit has a plurality of partial multipliers and is designed to form partial operands having a predetermined number of bits from the operands which are supplied in one step and to distribute said partial operands to a predetermined number of active partial multipliers from the plurality of partial multipliers and to calculate a respective partial product using the outputs from said partial multipliers.

According to a first partial aspect of this third aspect, the other variant of this device according to the third aspect is as follows:

the partial multiplier unit has a total number of partial multipliers which is greater than the predetermined number of partial multipliers necessary to calculate the respective partial product, and the total number of partial multipliers includes at least two groups of partial multipliers which implement different multiplication methods in groups; and the partial multiplier unit is designed to randomly select the predetermined number of activated partial multipliers from the total number of partial multipliers, subject to the condition that at least one of the partial multipliers belongs to a different group of partial multipliers than the other selected partial multipliers, and to distribute the partial operands only to the randomly selected partial multipliers.

As an alternative to the first partial aspect, the device according to the third aspect invention is further designed, according to a second partial aspect, as follows:

the partial multiplier unit has an input unit which is designed to form in one step partial operands having a predetermined number of bits from the operands supplied to it and to randomly allocate the partial operands to a predetermined number of partial multipliers, and to output control information which indicates how the partial operands have been allocated to the partial multipliers, wherein the partial multiplier unit does not have more partial multipliers than a predetermined number of partial multipliers necessary for the partial multiplication, a total number of partial multipliers is distributed among at least two groups each having et least one partial multiplier and the partial multipliers of each group implement a different multiplication method than the partial multipliers of the other groups, and wherein the partial multiplier unit has an output unit which receives the control information and which is designed to calculate and output the respective partial product using the outputs from said partial multipliers, in accordance with said control information.

Embodiments of this device may have the same additional features as the embodiments, already described, of the device according to the first or the second aspect. Further embodiments of the device according to all three aspects shall now be described.

One embodiment of the various devices, according to the different aspects of the invention described here, is a respective electronic circuit which implements a device according to one of the aspects described here, or according to one of the respective embodiments of said aspect.

Another embodiment is in the form of a cryptographic device for encrypting or decrypting binary coded information, comprising a device or an electronic circuit according to one of the aspects described here, or according to one of the respective embodiments of said aspect.

A fourth aspect of the invention is a hardware-implemented method for multiplying two bit sequences, said method comprising the steps of:

randomly selecting and activating exactly one multiplier unit for performing multiplication from a plurality of parallel multiplier units, wherein each multiplier unit implements a different multiplication method to perform multiplication and for that purpose has a respective selector unit and a respective accumulation unit which are designed for the multiplication method being implemented, wherein the selector unit of the respectively activated multiplier unit selects segments of the bit sequences to be multiplied, step by step in accordance with a selection plan adapted to the respective multiplication method, forms operands for a partial multiplication from the selected segments and outputs said operands to a partial multiplier unit, all multiplier units share exactly one partial multiplier unit which receives operands formed from one or more segments by the respectively activated multiplier unit and multiplies said operands with each other, wherein the accumulation unit of the activated multiplier unit receives step by step the partial products outputted by the partial multiplier unit, accumulates said partial products in accordance with an accumulation plan adapted to the implemented multiplication method and matching the selection plan, and outputs the calculated product of the bit sequences after accumulation has been completed.

A fifth aspect of the invention is a hardware-implemented method for multiplying two bit sequences, said method comprising the steps of:

selecting segments of the bit sequences to be multiplied and forming the operands for partial multiplication step by step in accordance with a selection plan, receiving and multiplying the formed operands in one step in a partial multiplier unit for forming partial products, receiving and accumulating said partial products in accordance with an accumulation plan matching the selection plan and outputting the calculated product of the bit sequences after accumulation has been completed, wherein a) either partial operands having a predetermined number of bits are formed in a partial multiplier unit from the operands for the purpose of multiplying the received operands and are distributed to a predetermined number of (internal) partial multipliers of the partial multiplier unit, and a respective partial product is calculated using the outputs from the partial multipliers, wherein the partial multiplier unit has a total number of partial multipliers which is greater than the predetermined number of partial multipliers necessary to calculate the respective partial product, and the total number of partial multipliers includes at least two groups of partial multipliers which implement different multiplication methods in groups, wherein the partial multiplier unit randomly selects the predetermined number of activated, partial multipliers from the total number of partial multipliers, subject to the condition that at least one of the partial multipliers belongs to a different group of partial multipliers than the other selected partial multipliers, and distributes the partial operands only to the randomly selected partial multipliers, b) or the partial multiplier unit forms in one step partial operands having a predetermined number of bits from the operands supplied to it and allocates and outputs the partial operands in a random manner to a predetermined number of partial multipliers, and outputs control information which indicates how the partial operands have been allocated to the partial multipliers, wherein the partial multiplier unit does not have more partial multipliers than a predetermined number of partial multipliers necessary for the partial multiplication, a total number of partial multipliers in the partial multiplier unit is distributed among at least two groups each having at least one partial multiplier and the partial multipliers of each group implement a different multiplication method than the partial multipliers of the other groups, and wherein the partial multiplier unit receives outputs in accordance with the control information from the respective partial multipliers indicated therein and calculates and outputs the respective partial product.

Another aspect of the invention is a hardware-implemented method for multiplying two bit sequences, said method comprising the steps of:

selecting segments of the bit sequences to be multiplied and forming operands for partial multiplications step by step in accordance with a selection plan, receiving and multiplying the operands in one step to form partial products, receiving and accumulating said partial products in accordance with an accumulation plan matching the selection plan and outputting the calculated product of the bit sequences after accumulation has been completed, wherein the selection steps and accumulation steps predefined in the respective selection plan and in the respective accumulation plan are performed in random order.

One advantage of the approach proposed here which all the aspects described above implement, is that protection of the operation is intrinsically included in the implementation. That means that, by randomly selecting the multiplication method for each execution of the multiplication (especially serial multiplication), the number of steps necessary for calculating the product varies. The time needed for one processing of bit sequences (of a cryptographic key, for example), in which several multiplications are to be performed, changes, therefore, in a way that cannot be predicted or traced externally. Unlike solutions known from the prior art, this solution according to the invention does not require any additional dummy operations or the addition of random delays. Only operations which are actually necessary for the calculation are executed. For that reason, and additionally due to a random permutation of the steps in the execution plan for multiplication, where relevant, an attacker is denied the possibility of acquiring knowledge about which data have been processed in which step and in which way exactly. A result similar to that obtained with the known technique of input "blinding" is thus achieved. However, in contrast to "blinding", no additional operation is needed that can then be jumped over in an attack by injecting an error.

BRIEF DESCRIPTION OF THE DRAWINGS

Further embodiments shall be described below with reference to the Figures, in which.

DETAILED DESCRIPTION

Figure 1:
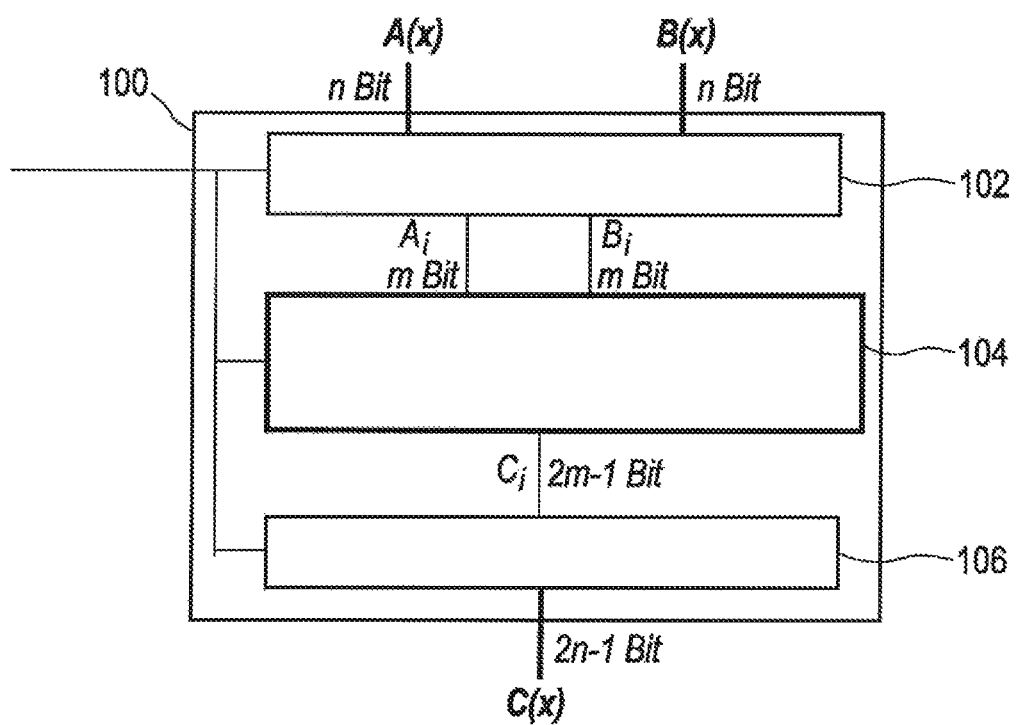
FIG. 1 shows a block diagram of serial implementation of the multiplication of the elements from $GF(2^n)$, without reduction, in accordance with the prior art.

FIG. 1 shows a block diagram of a hardware-implemented device 100, that is to say one embodied as an electronic circuit, for serial multiplication of two bit sequences from GF(2"), without reduction, as in the prior art. Two bit sequences A(x) and B(x), each n bits long, are supplied to a selector unit 102, which forms operands $A_i$ and $B_i$, m bits long, from the bit sequences in accordance with a predetermined selection plan, where m<n. These operands are supplied to a partial multiplier unit 104, which accordingly calculates partial products which are 2m−1 in length. The partial products are supplied to an accumulation unit 106, which calculates the 2n−1 bit product C(x) of bit sequences A(x) and B(x), in accordance with a predetermined accumulation plan. All the units are operated using a common clock from a clock signal source not shown here, and which is symbolized by a clock line leading to the blacks from the left.

The effect of such a multiplier on the power consumption cryptographic chip while executing a kP-operation is so strong that its power consumption can determine the profile of a power trace (PT) which can be captured in an attack. Since the PT is suitable leakage for a side-channel attack ("SCA leakage"), it is desirable to stop this leakage. According to the invention, analysis of a PT can be impeded in the following manner 1—by random selection of the multiplication method for each serial execution of the multiplication 2—by random permutation of the steps in the execution plan for the serial multiplication 3—by individualizing the structure of the partial multiplier unit for each calculation of the partial product, by randomly activating one of the individualized partial multiplier unit or by randomly activating the x sufficient from k implemented, individualized inner partial multiplier, where x≤k. In the special case where k=x, and when the partial multipliers are individualized, the inputs can be supplied in "mixed" form. This means that the partial operands are distributed randomly in each clock cycle, but that the inner partial accumulation unit is designed to add the products of the partial operands "correctly".

All three measures can be combined with each other arbitrarily. These measures shall now be described separately.

1. Randomized Activation of One of Several Implemented Multiplication Methods for (Serial) Calculation of the Product Many different multiplication methods can be implemented in one and the same device. Before each multiplication, only one of the implemented multiplication methods is randomly activated in order to calculate the product.

In one embodiment, the resources are optimized as follows:

All implemented multiplication methods use the same partial multiplier unit (for example a partial multiplier unit available in just one design). This is particularly easy to implement when ail the multiplication methods (MM) subdivide the operands in the same way, such that the two n-bit bit sequences (factors) are subdivided into ξ m-bit segment, where m=n/ξ. In this case, the implemented multiplication methods differ in the respective number of execution steps (or execution clocks), i.e., each multiplication method $MM_j$ requires its own number of clocks $N_j$. Selecting the segments, according to clock cycles, for calculating the operands for the partial multiplier unit, and the accumulation plan for the calculated partial products, i.e., the execution plan for multiplication, depends on the selected multiplication method. That means, in this case, that the multiplier consists of J election blocks for selecting the operands of the partial multiplier (TM), only one partial multiplier unit, and one accumulation unit comprising J blocks for "accumulation of the partial products", when a total of J multiplication methods have been implemented in the design.

Figure 2:
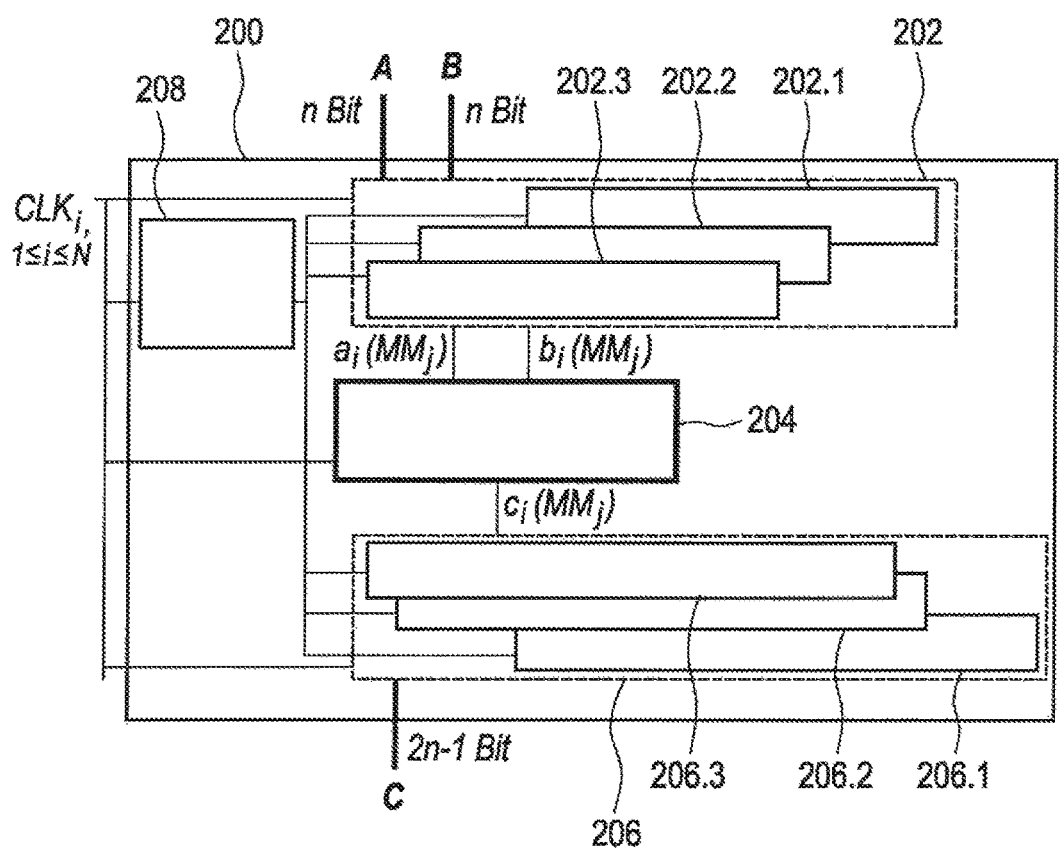
FIG. 2 shows a block diagram of a hardware implementation of a multiplication device for multiplying two bit sequences, with a choice of multiplication method.

The structure of such a polynomial multiplier is shown schematically in FIG. 2, which shows a block diagram of a hardware-implemented device 200, that is to say one embodied as an electronic circuit, for serial multiplication of two bit sequences from GF(2"), without reduction. The present embodiment implements three multiplication methods, said number being chosen here to enable clear, graphical illustration of the present invention, but should not be understood as limiting the invention to that particular number of methods.

Two bit sequences A(x) and B(x), n bits long, are supplied to a selection block 202. Selection block 202 contains a plurality of selector units 202.1 to 202.3 corresponding to the number of implemented multiplication methods. Each of said selector units is designed to form m-bit operands $a_i(MM_j)$ and $b_i(MM_j)$, from the bit sequences in accordance with a predetermined selection plan corresponding to the multiplication method, where m<n. These operands are supplied to a shared partial multiplier unit 204, which accordingly calculates 2m−1 partial products $c_i(MM_j)$. The partial products are supplied to an accumulation unit 206.1, 206.2 or 206.2, according to the selected multiplication method, of an accumulation block 206, which calculates the 2n−1-bit products C(x) of bit sequences A(x) and B(x) in accordance with a predetermined accumulation plan corresponding to the selected multiplication method.

In the present application, the selector and accumulation units belonging to the implementation of a particular multiplication method are also referred to, from an alternative functional perspective, as the respective multiplier unit.

The units can be distributed over the chip area according to known methods of circuitry design. To that extent, the graphical combination of selector units 202.1-202.3 in one selection block 206, and of accumulation units 206.1-206.3 in one accumulation unit 206 in FIG. 2 does not signify a mandatory structural design of the device, but merely one implementation option. In alternative embodiments, the respective selector and accumulation units belonging to a particular multiplication method may be grouped together.

All the units are driven using a common clock from a clock signal source not shown here, and which is symbolized by a clock line leading to the circuitry blocks from the left.

Selection of the multiplication method and the respective activation of the selector and accumulation units is performed by a controller 208, which is adapted to randomly select exactly one multiplier unit for performing multiplication from a plurality of parallel multiplier units, according to a random signal on the input side.

When the implemented multiplication methods use a different subdivision of operands, such that the two n-bit factors are subdivided into $ξ_j$ $m_j$-bit segment, where $m_j=n/ξ_j$, it is then possible to use the same shared partial multiplier unit for m-bit operands, if the following holds true, for each j: m≥$m_j$.

2. Random Permutation of the Steps in the Execution Plan for the Serial Multiplication The serial implementation of a selected multiplication method, described above, adheres to a fixed execution plan which runs for N clocks, due to its comprising N steps. This order of steps—from step no. 1. to step no. N—is implemented by step counters.

However, the respective step in, the execution plan to be carried out can be selected randomly on a clock by clock basis. There are several ways in which that selection can be implemented. For the purposes of the following description, it is assumed by way of example that N=9, i.e., that steps 1 to 9 are to be carried out, and that the fixed execution plan described above has the following order of steps: 1-2-3-4-5-6-7-8-9

Variant 1

The first step of the randomized execution plan may be randomly selected from the entire set of execution steps {Step1, Step2, . . . , Step9} and executed. The step thus selected and executed is excluded in that moment or afterwards from the set of execution steps still to be carried out i.e., the set of steps is updated. The next step of the randomized accumulation plan may be randomly selected from that updated set of execution steps and carried out. As in the variant involving a fixed execution plan, N=9 steps are still needed in order to execute all the steps of the accumulation plan, i.e., only the order in which the steps of the execution plan are executed is randomly permuted in this way. The selection of data to be processed in each specific clock is random, however, and is therefore unknown to the attacker. Every execution of the multiplication operation is individualized in this manner: which particular parts of the factors are processed in which particular clock cycle is now randomized and is no longer known to the attacker.

Variant 2

All the steps in the randomized accumulation plan can be selected randomly from the full set of execution steps {Step1, Step2, . . . , Step9}. When the step is selected from the set for the first time, it is executed. Multiple selection of the same step may initiate multiple processing of the operands to be multiplied, or of random data. The result of such processing following repeated selection of a particular step is ignored in whatever case. An additional counter of the actually performed steps of the execution plan is needed in this variant, thus increasing the amount of hardware involved. Increased power consumption and a greater length of time needed for multiplication can also be named as a disadvantage, because in this case the number of execution clocks is highly likely to be greater than in the case of the previously described variants (≥N). From the security perspective, however, such an implementation has major advantages: the duration of each polynomial multiplication is randomized; which inputs, real or random, were processed in the current clock cycle is not made known to the attacker.

3. Randomized Activation of (At Least) One Individualized Partial Multiplier (On a Clock by Clock Basis)

There are more than ten different multiplication methods currently in existence that can be presented in the form of multiplication equations. Each of those equations has its own way of splitting the factors into parts (or segments), an individual number of partial products of the operands, each only one segment long, and its own number of additions of partial products. In other words, each multiplication method has its own complexity, which is manifested as an individual number and interconnection of gates in a given hardware implementation.

Different multiplication methods may also be combined with each other when calculating a product. Each of these combinations has its own complexity. The number of possible combinations is therefore very large. In embodiments of the present invention, this fact is exploited for a special structure of the partial multiplier unit: the partial multiplier unit may contain a plurality of (internal) partial multipliers which each implement one multiplication method from a number of different multiplication methods in order to calculate a partial product. When the partial multiplier unit has a number of internal partial multipliers which is greater than the number required to calculate the partial product, the rest of the partial multipliers can be either deactivated in that clock cycle, in order to save energy, or can process random data in order to generate noise which reduces the information contained in a power trace, thus impeding any power analysis such as DPA.

Figure 3:
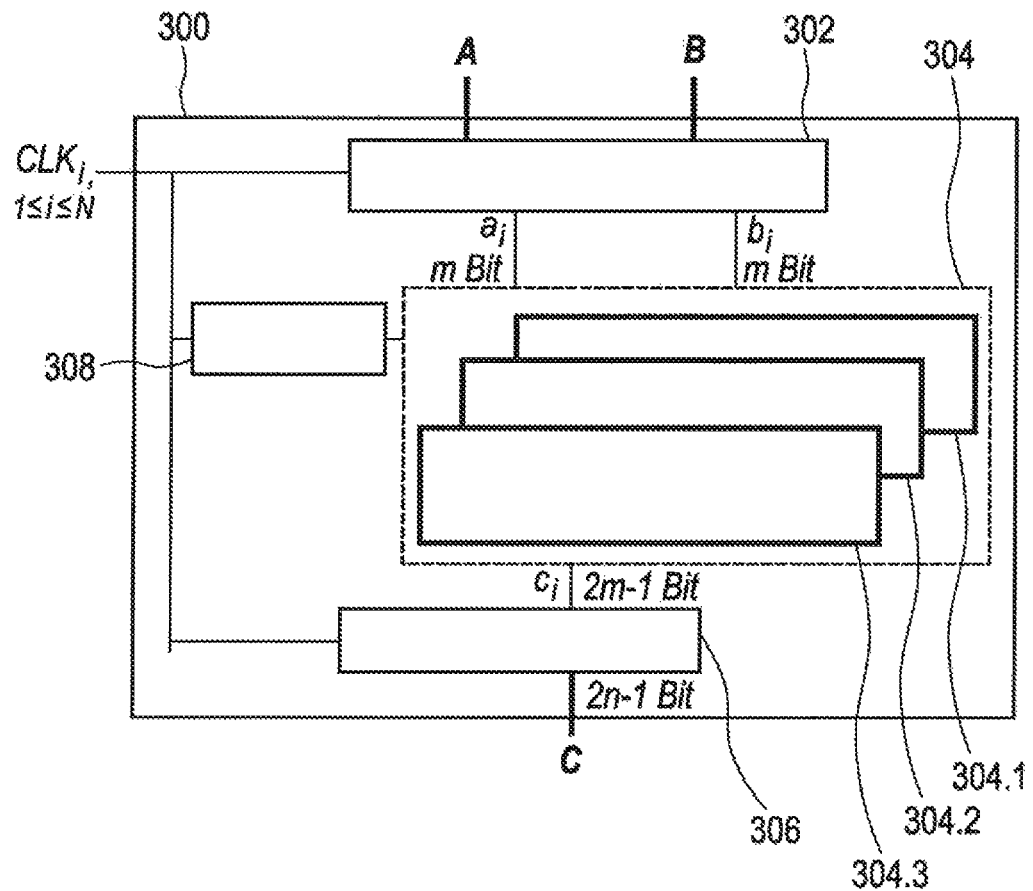
FIG. 3 shows a block diagram of another hardware implementation of a multiplication device for multiplying two bit sequences, with a fixed multiplication method and with a plurality of partial multiplier units which can calculate a respective partial product in one step, wherein all the partial multiplier units each have their own, individualized structure.

FIG. 3 shows a block diagram of another implementation of device 300 for multiplication, with a fixed multiplication method for serial multiplication and with a plurality of partial multiplier units which can calculated the partial product in one step, each the partial multipliers having its own—individualized—structure. FIG. 3 shows, by way of example, a schematic view of an implementation which calculates a product of the elements from $GF(2^n)$ without reduction, and which has three individualized partial multiplier units.

The structure of device 300 basically resembles the implementation shown in FIG. 1. However, in contrast to FIG. 1, the design includes a partial multiplier block 304, in this example with two additional partial multiplier units, making a total of three partial multiplier units 304.1-304.3. The number of partial multiplier units can be specified at one's own discretion when designing the circuit. The more partial multiplier units are used, the greater the protective effect against attacks. On the other hand, the chip, area and the power consumption increase. Controller 308 is used to randomly activate one of the partial multiplier units 304.1-304.3 on a clock by clock basis. In each clock cycle, therefore, only one of said partial multiplier units needs to be activated, i.e., it will process inputs $a_i$ and $b_i$. Since the complexity of all three partial multiplier units 304.1-304.3 is different, i.e., individual, any power trace, which is the source of the SCA leakage, is dependent not only on the processed inputs and the key which is used, but also on the complexity of the respective partial multiplier units that are active in a given clock cycle. Randomized activation of the partial multiplier units on a clock by clock basis has a complex impact on the shape of any power trace that is measured, and can significantly impede power analysis.

There is no need for exactly one partial multiplier unit to be activated in each case. In some variants, several or even all of the units are activated.

Figure 4:
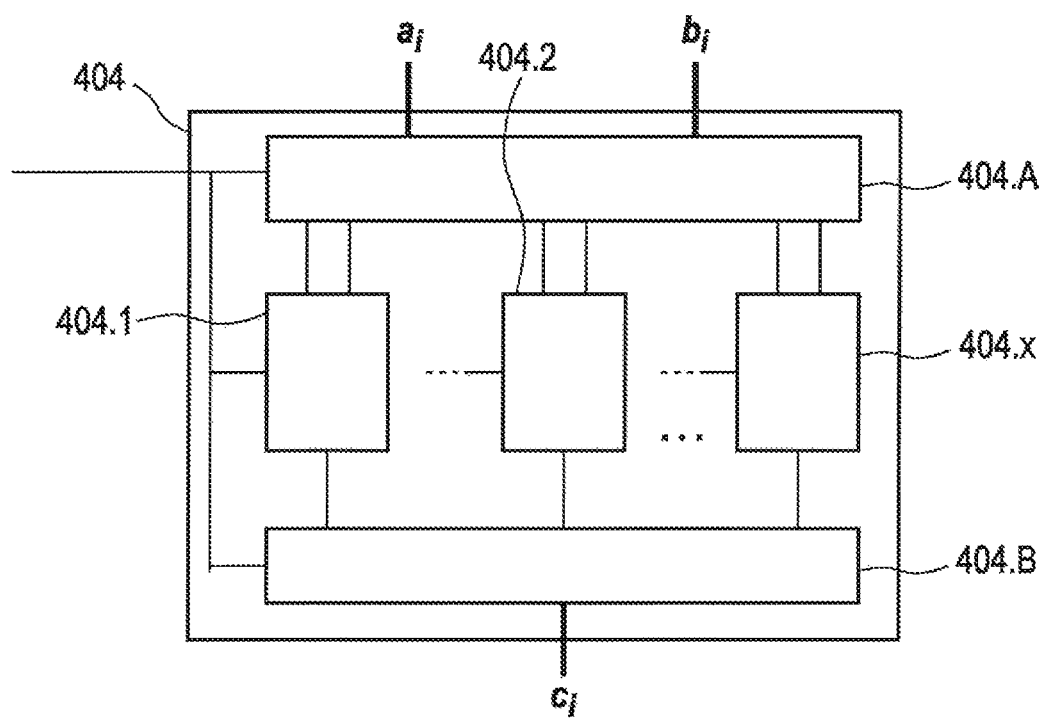
FIG. 4 shows a block diagram, of another hardware implementation of a multiplication device for multiplying two bit sequences, with a partial multiplier unit, the active structure of which can be individualized dynamically in each step of the multiplication plan.
Figure 5:
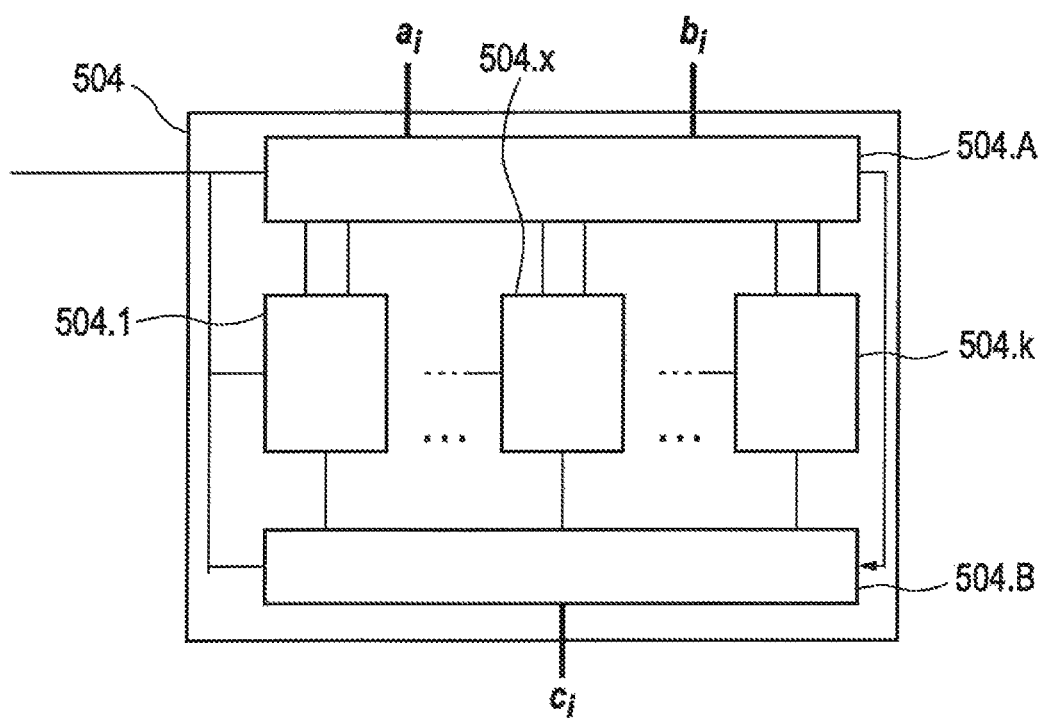
FIG. 5 a block diagram of a variant of the hardware implementation of a multiplication device from FIG. 4.

In the description of, further variants below, parallel reference is made to FIGS. 4 and 5. FIG. 4 shows a block diagram of a partial multiplier unit whose active structure can be individualized dynamically, i.e., in each step of a multiplication plan. FIG. 5 shows a block diagram of one variant of a partial multiplier unit from FIG. 4.

Partial multiplier unit 404 in FIG. 4 contains a plurality x of (internal) partial multiplier 404.1, 404.2-404.x connected in parallel, which together serve to calculate a respective partial product, the circuit of at least one of these partial multipliers being individualized, i.e., it differs from the circuits of other partial multipliers. A selector unit 404.A selects, from the supplied factors $a_i$ and $b_i$ in accordance with a predefined selection plan, the parts to be multiplied by partial multipliers and randomly selects which parts are to be processed by which of the partial multipliers, i.e., it randomly supplies the partial multipliers with the respectively selected parts. An accumulation unit 404.B is able to recognize how the products calculated by the partial multipliers re to be accumulated in order to obtain the correct partial product.

As a variant of the one shown in FIG. 4, the partial multiplier unit 504 in FIG. 5 contains, in addition to a number x of required partial multipliers 504.1-504.x, a number (k-x) of additional (superfluous) partial multipliers, of which only partial multiplier 504.k is shown. At least one additional partial multiplier is provided, which means that k is at least (x+1), at least one, of said k partial multipliers being individualized, i.e., has its own structure and circuitry differing from those of other partial multipliers. Instead of a number x of inner partial multipliers necessary to calculate a respective partial product, there are an additional (k-x) partial multipliers available for each step, so that the total number of partial multipliers available is k, of which only x randomly selected partial multipliers are activated in each clock cycle. Which particular partial multipliers are (randomly) activated is determined by selector unit 504.A. Accumulation unit 504.B receives control information about the respective selection made from selector unit 504.A.

In another variant, each of the available partial multipliers 504.1-504.k can be implemented according to its own combination of multiplication methods, i.e., can be implemented in individualized form. In such a variant, all the partial multipliers 504.1-504.k consists of different (individualized) numbers of gates and have a different (individualized) structure, complexity and circuitry. This means that electromagnetic (EM) radiation and the power consumption during calculation of the partial products is dependent not only on partial multiplier inputs, but also on the x partial multipliers that are respectively activated (in a randomized manner).

This effect is also achieved, to slightly less an extent, in another variant in which not all the partial multipliers implement their own, individualized multiplication method and therefore have different degrees of complexity, but where only a part of them—at least one of the activated partial multipliers—is individualize in the manner described.

Another variant of the one shown in FIG. 4, which dynamically influences the shape of the measured power trace from the structure of the partial multiplier, implements a randomized distribution of the input data to the individualized partial multipliers 404.1-404.x (see FIG. 4), of which only x are necessary. In this variant, an additional controller (not shown) is implemented in selector unit 404.A and accumulation unit 404.B, which accumulates the outputs from the partial multiplier in such a way, despite the random distribution of the input data among partial multipliers 404.1-404.x, that the partial product, i.e., the output of the partial multiplier unit, is correct.

Variants of the various aspects and embodiments of the invention described above are possible.

A combination of the measures described above may be used to implement a highly flexible multiplier. In other words, although different chips provide identical functions externally, their power traces are individualized even when processing the same inputs, and indeed even when repeated measurements are made with the same inputs. Side-channels attacks are significantly impeded as a result.

In other embodiments, a selection method which is not literally randomized, but which is still sufficiently complicated, i.e. which can only be traced externally with an uneconomical amount of effort, is substantially equal in worth to randomized selection of a multiplication method. Examples of such alternative selection methods are, known per se and are also referred to as semi-randomized selection methods.

In summary, the present invention provides a device for multiplying two bit sequences. A controller selects and activates exactly one multiplier unit from a plurality of parallel multiplier units, according to a random signal. A partial multiplier unit shared by all the multiplier units receives and multiplies operands formed by the respectively activated multiplier unit. Each of the multiplier units implements a different multiplication method to perform a multiplication and for that purpose has a respective selector unit and a respective accumulation unit which are designed for the multiplication method being implemented. The respective selector unit selects segments of the bit sequences to be multiplied, step by step in accordance with a selection plan adapted to the respective multiplication method, forms operands from one or more segments and outputs said operands to the partial multiplier unit. The respective accumulation unit receives step by step partial products outputted by the partial multiplier unit, accumulates said partial products in accordance with an accumulation plan adapted to the implemented multiplication method and matching the selection plan, and outputs the calculated product of the bit sequences after accumulation has been completed.

What is claimed is:

1. A device for multiplying two bit sequences, comprising:
   a controller which is adapted to select and activate, according to a random signal on the input side, exactly one multiplier unit for performing multiplication from a plurality of parallel multiplier units,
   a partial multiplier unit which is shared by all multiplier units and is adapted to receive operands formed by a respectively activated multiplier unit and to multiply the received operands with each other, wherein
   each multiplier unit implements a different multiplication method to perform a multiplication and for that purpose has a respective hardware selector unit and a respective hardware accumulation unit which are designed for the multiplication method being implemented, wherein
   the respective hardware selector unit is designed to select segments of the bit sequences to be multiplied, step by step in accordance with a selection plan adapted to the respective multiplication method, to form operands from one or more segments and to output said operands to the partial multiplier unit, and wherein
   the respective hardware accumulation unit is designed to receive step by step the partial products outputted by the partial multiplier unit, to accumulate said partial products in accordance with an accumulation plan adapted to the implemented multiplication method and matching the selection plan, and to output the calculated product of the bit sequences after accumulation has been completed.

2. The device according to claim 1, wherein the respective multiplier unit is additionally designed to randomly permute a sequence of selection steps and accumulation steps predefined in the respective selection plan and in the respective accumulation plan.

3. The device according to claim 2, wherein
   the partial multiplier unit has a plurality of internal partial multipliers and is designed to form partial operands having a predetermined number of bits in a respective step from the operands which are supplied and to distribute said partial operands to a predetermined number of partial multipliers and to calculate a respective partial product using outputs from the predetermined number of partial multipliers, wherein the partial multiplier unit for calculating the respective partial product has a total number of partial multipliers which is greater than the predetermined number of partial multipliers necessary to calculate the respective partial product, and the total number of partial multipliers includes at least two groups of partial multipliers which implement different multiplication methods in groups, and wherein the partial multiplier unit is designed to randomly select the predetermined number of activated partial multipliers from the total number of partial multipliers, subject to the condition that at least one of the partial multipliers belongs to a different group of partial multipliers than the other selected partial multipliers, and to distribute the partial operands only to the randomly selected partial multipliers.

4. The device according to claim 2, wherein the partial multiplier unit has an input unit which is designed to form in one step partial operands having a predetermined number of bits from the operands supplied to it and to allocate and output the partial operands in a random manner to a predetermined number of partial multipliers, and to output control information which indicates how the partial operands have been allocated to the partial multipliers, wherein the partial multiplier unit does not have more partial multipliers than a predetermined number of partial multipliers necessary for the partial multiplication, a total number of partial multipliers is distributed among at least two groups each having at least one partial multiplier and the partial multipliers of each group implement a different multiplication method than the partial multipliers of the other groups, and wherein the partial multiplier unit has an output unit which receives the control information and which is designed to receive outputs from the respective partial multipliers and to calculate and output the respective partial product, in accordance with said control information.

5. An electronic circuit comprising a device according to claim 1.

6. A cryptographic device for encrypting or decrypting binary coded information, comprising a device according to claim 1.

7. The device according to claim 1, wherein the partial multiplier unit has a plurality of internal partial multipliers and is designed to form partial operands having a predetermined number of bits in a respective step from the operands which are supplied and to distribute said partial operands to a predetermined number of partial multipliers and to calculate a respective partial product using the outputs from the predetermined number of partial multipliers, wherein the partial multiplier unit for calculating the respective partial product has a total number of partial multipliers which is greater than the predetermined number of partial multipliers necessary to calculate the respective partial product, and the total number of partial multipliers includes at least two groups of partial multipliers which implement different multiplication methods in groups, and wherein the partial multiplier unit is designed to randomly select the predetermined number of activated partial multipliers from the total number of partial multipliers, subject to the condition that at least one of the partial multipliers belongs to a different group of partial multipliers than the other selected partial multipliers, and to distribute the partial operands only to the randomly selected partial multipliers.

8. The device according to claim 1, wherein the partial multiplier unit has an input unit which is designed to form in one step partial operands having a predetermined number of bits from the operands supplied to it and to allocate and output the partial operands in a random manner to a predetermined number of partial multipliers, and to output control information which indicates how the partial operands have been allocated to the partial multipliers, wherein the partial multiplier unit does not have more partial multipliers than a predetermined number of partial multipliers necessary for the partial multiplication, a total number of partial multipliers is distributed among at least two groups each having at least one partial multiplier and the partial multipliers of each group implement a different multiplication method than the partial multipliers of the other groups, and wherein the partial multiplier unit has an output unit which receives the control information and which is designed to receive outputs from the respective partial multipliers and to calculate and output the respective partial product, in accordance with said control information.

9. A device for multiplying two bit sequences, comprising:

a hardware selector unit which is designed to select segments of the bit sequences to be multiplied, in accordance with a selection plan, to form operands from one or more segments and to output said operands to the partial multiplier unit, a partial multiplier unit, which is designed to receive the operands formed and to multiply them with each other in one step, an hardware accumulation unit which is designed to receive partial products outputted by the partial multiplier unit, to accumulate said partial products in accordance with an accumulation plan matching the selection plan, and to output the calculated product of the bit sequences after accumulation has been completed, wherein the hardware selector unit and the hardware accumulation unit are designed to randomly permute a sequence of selection steps and accumulation steps predefined in the respective selection plan and in the respective accumulation plan; wherein the partial multiplier unit has a plurality of partial multipliers and is designed to form partial operands having a predetermined number of bits from the operands which are supplied in one step and to distribute said partial operands to a predetermined number of active partial multipliers from the plurality of partial multipliers and to calculate a respective partial product using the outputs from said partial multipliers, wherein a) either the partial multiplier unit has a total number of partial multipliers which is greater than the predetermined number of partial multipliers necessary to calculate the partial product, and the total number of partial multipliers includes at least two groups of partial multipliers which implement different multiplication methods in groups, the partial multiplier unit is designed to randomly select the predetermined number of activated partial multipliers from the total number of partial multipliers, subject to the condition that at least one of the partial multipliers belongs to a different group of partial multipliers than the other selected partial multipliers, and to distribute the partial operands only to the randomly selected partial multipliers, b) or the partial multiplier unit has an input unit which is designed to form in one step partial operands having a predetermined number of bits from the operands supplied to it and to allocate and output the partial operands in a random manner to a predetermined number of partial multipliers, and to output control information which indicates how the partial operands have been allocated to the partial multipliers, wherein the partial multiplier unit does not have more partial multipliers than a predetermined number of partial multipliers necessary for the partial multiplication, a total number of partial multipliers is distributed among at least two groups each having at least one partial multiplier and the partial multipliers of each group implement a different multiplication method than the partial multipliers of the other groups, and wherein the partial multiplier unit has an output unit which receives the control information and which is designed to receive outputs from the respective partial multipliers and to calculate and output the respective partial product, in accordance with said control information.

10. A device for multiplying two bit sequences, comprising:

a hardware selector unit which is designed to select, step by step in accordance with a selection plan, segments of the bit sequences to be multiplied, to form the inputs for the partial multiplier units from said selected segments and to output said inputs to the partial multiplier unit, a partial multiplier unit, which is designed to receive the operands supplied and to multiply them with each other in one step, an hardware accumulation unit which is designed to receive step by step partial products outputted by the partial multiplier unit, to accumulate said partial products in accordance with an accumulation plan matching the selection plan, and to output the calculated product of the bit sequences after accumulation has been completed, wherein the partial multiplier unit has a plurality of partial multipliers and is designed to form partial operands having a predetermined number of bits from the operands which are supplied in one step and to distribute said partial operands to a predetermined number of active partial multipliers from the plurality of partial multipliers and to calculate a respective partial product using the outputs from said partial multipliers, wherein a) either the partial multiplier unit has a total number of partial multipliers which is greater than the predetermined number of partial multipliers necessary to calculate the respective partial product, and the total number of partial multipliers includes at least two groups of partial multipliers which implement different multiplication methods in groups, and the partial multiplier unit is designed to randomly select the predetermined number of activated partial multipliers from the total number of partial multipliers, subject to the condition that at least one of the partial multipliers belongs to a different group of partial multipliers than the other selected partial multipliers, and to distribute the partial operands only to the randomly selected partial multipliers, b) or the partial multiplier unit has an input unit which is designed to form in one step partial operands having a predetermined number of bits from the operands supplied to it and to randomly allocate the partial operands to a predetermined number of partial multipliers, and to output control information which indicates how the partial operands have been allocated to the partial multipliers, wherein the partial multiplier unit does not have more partial multipliers than a predetermined number of partial multipliers necessary for the partial multiplication, a total number of partial multipliers is distributed among at least two groups each having at least one partial multiplier and the partial multipliers of each group implement a different multiplication method than the partial multipliers of the other groups, and wherein the partial multiplier unit has an output unit which receives the control information and which is designed to receive outputs from the respective partial multipliers and to calculate and output the respective partial product using said outputs, in accordance with said control information.

11. A hardware-implemented method for multiplying two bit sequences, said method comprising the steps of:

randomly selecting and activating exactly one multiplier unit for performing multiplication from a plurality of parallel multiplier units, wherein each multiplier unit implements a different multiplication method to perform multiplication and for that purpose has a respective hardware selector unit and a respective hardware accumulation unit which are designed respectively for the multiplication method being implemented, wherein the hardware selector unit of the respectively activated multiplier unit selects segments of the bit sequences to be multiplied, step by step in accordance with a selection plan adapted to the respective multiplication method, forms operands for a partial multiplication from the selected segments and outputs said operands to a partial multiplier unit, all multiplier units share exactly one partial multiplier unit which receives operands formed from one or more segments by the respectively activated multiplier unit and multiplies said operands with each other, wherein the hardware accumulation unit of the activated multiplier unit receives step by step the partial products outputted by the partial multiplier unit, accumulates said partial products in accordance with an accumulation plan adapted to the implemented multiplication method and matching the selection plan, and outputs the calculated product of the bit sequences after accumulation has been completed.

12. A hardware-implemented method for multiplying two bit sequences, said method comprising the steps of:

selecting segments of the bit sequences to be multiplied and forming the operands for partial multiplication step by step in accordance with a selection plan, receiving and multiplying the formed operands in one step in a partial multiplier unit for forming partial products, receiving and accumulating said partial products in accordance with an accumulation plan matching the selection plan and outputting the calculated product of the bit sequences after accumulation has been completed, wherein a) either partial operands having a predetermined number of bits are formed in a partial multiplier unit from the operands for the purpose of multiplying the received operands and are distributed to a predetermined number of partial multipliers of the partial multiplier unit, and a respective partial product is calculated using outputs from the partial multipliers, wherein the partial multiplier unit has a total number of partial multipliers which is greater than the predetermined number of partial multipliers necessary to calculate the respective partial product, and the total number of partial multipliers includes at least two groups of partial multipliers which implement different multiplication methods in groups, wherein the partial multiplier unit randomly selects the predetermined number of activated partial multipliers from the total number of partial multipliers, subject to the condition that at least one of the partial multipliers belongs to a different group of partial multipliers than the other selected partial multipliers, and distributes the partial operands only to the randomly selected partial multipliers, b) or the partial multiplier unit forms in one step partial operands having a predetermined number of bits from the operands supplied to it and allocates and outputs the partial operands in a random manner to a predetermined number of partial multipliers, and outputs control information which indicates how the partial operands have been allocated to the partial multipliers, wherein the partial multiplier unit does not have more partial multipliers than a predetermined number of partial multipliers necessary for the partial multiplication, a total number of partial multipliers in the partial multiplier unit is distributed among at least two groups each having at least one partial multiplier and the partial multipliers of each group implement a different multiplication method than the partial multipliers of the other groups, and wherein the partial multiplier unit receives outputs in accordance with the control information from the respective partial multipliers indicated therein, and calculates and outputs the respective partial product.

* * * * *